(12) United States Patent
Abbaszadeh et al.

(10) Patent No.: US 11,475,124 B2
(45) Date of Patent: Oct. 18, 2022

(54) ANOMALY FORECASTING AND EARLY WARNING GENERATION

(71) Applicant: General Electric Company, Schenectady, NY (US)

(72) Inventors: Masoud Abbaszadeh, Clifton Park, NY (US); Lalit Keshav Mestha, North Colonie, NY (US)

(73) Assignee: General Electric Company, Schenectady, NY (US)

( * ) Notice: Subject to any disclaimer, the term of this patent is extended or adjusted under 35 U.S.C. 154(b) by 668 days.

(21) Appl. No.: 15/594,779

(22) Filed: May 15, 2017

(65) Prior Publication Data
US 2018/0330083 A1    Nov. 15, 2018

(51) Int. Cl.
*G06F 21/55* (2013.01)
*G06N 5/04* (2006.01)
(Continued)

(52) U.S. Cl.
CPC .......... *G06F 21/552* (2013.01); *G06F 21/577* (2013.01); *G06N 5/04* (2013.01); *G06N 20/00* (2019.01)

(58) Field of Classification Search
CPC ...... G06F 21/552; G06F 21/577; G06F 21/55; G06N 5/04; G06N 20/00
(Continued)

(56) References Cited

U.S. PATENT DOCUMENTS 5,847,658 A * 12/1998 Irie .................. G01H 1/00
702/56
9,967,275 B1 * 5/2018 Koi .................. H04L 63/1425
(Continued)

FOREIGN PATENT DOCUMENTS

WO    2016176682 A1    11/2016

OTHER PUBLICATIONS

Kang et al., "Ultra-Short-Term Wind Power Prediction and its Application in Early-Warning System of Power Systems Security and Stability", 4th International Conference on Electric Utility Deregulation and Restructuring and Power Technologies (DRPT), http://ieeexplore.ieee.org/document/5993979/, Jul. 6-9, 2011, 6 pp.
(Continued)

*Primary Examiner* — Sanchit K Sarker
(74) *Attorney, Agent, or Firm* — Buckley, Maschoff & Talwalkar LLC

(57) ABSTRACT

The example embodiments are directed to a system and method for forecasting anomalies in feature detection. In one example, the method includes storing feature behavior information of at least one monitoring node of an asset, including a normalcy boundary identifying normal feature behavior and abnormal feature behavior for the at least one monitoring node in feature space, receiving input signals from the at least one monitoring node of the asset and transforming the input signals into feature values in the feature space, wherein the feature values are located within the normalcy boundary, forecasting that a future feature value corresponding to a future input signal from the at least one monitoring node is going to be positioned outside the normalcy boundary based on the feature values within the normalcy boundary, and outputting information concerning the forecasted future feature value being outside the normalcy boundary for display.

21 Claims, 6 Drawing Sheets

(51) Int. Cl.
*G06F 21/57* (2013.01)
*G06N 20/00* (2019.01)
(58) Field of Classification Search
USPC .......................................................... 726/23
See application file for complete search history.

(56) References Cited

U.S. PATENT DOCUMENTS

| | | | |
|---|---|---|---|
| 10,148,680 B1* | 12/2018 | Segev ................. H04L 63/1425 |
| 2004/0083389 A1* | 4/2004 | Yoshida .............. G06F 11/3495 | 709/224 |
| 2004/0148140 A1* | 7/2004 | Tarassenko .......... A61B 5/0205 | 702/19 |
| 2006/0236374 A1 | 10/2006 | Hartman | |
| 2007/0226796 A1* | 9/2007 | Gilbert ................. G06F 21/577 | 726/25 |
| 2012/0284790 A1 | 11/2012 | Bhargava | |
| 2013/0063264 A1* | 3/2013 | Oktem ................. G06F 16/122 | 706/50 |
| 2013/0297729 A1* | 11/2013 | Suni ....................... H04L 67/34 | 709/217 |
| 2014/0298098 A1* | 10/2014 | Poghosyan ............. G06F 17/18 | 714/37 |
| 2015/0178865 A1 | 6/2015 | Anderson et al. | |
| 2016/0253495 A1 | 9/2016 | Kolacinski et al. | |
| 2016/0379326 A1 | 12/2016 | Chan et al. | |
| 2017/0032130 A1* | 2/2017 | Joseph Durairaj ..... H04L 41/16 |
| 2017/0124478 A1* | 5/2017 | Baradaran .............. G06N 20/00 |
| 2017/0147930 A1* | 5/2017 | Bellala ..................... G06N 5/04 |
| 2017/0284896 A1* | 10/2017 | Harpale ................. G01M 15/14 |
| 2017/0316180 A1* | 11/2017 | Takeda ................... G16H 10/60 |
| 2018/0024537 A1* | 1/2018 | Chauvet ........... G05B 19/41865 | 718/104 |
| 2018/0183819 A1* | 6/2018 | Le ........................ H04L 63/1416 |
| 2018/0188704 A1* | 7/2018 | Celia .................. G05B 19/0425 |
| 2018/0220314 A1* | 8/2018 | Chen ..................... H04W 24/08 |
| 2018/0255091 A1* | 9/2018 | Mestha ............... H04L 63/1416 |

OTHER PUBLICATIONS

Hong et al., "Cyber-Physical Security in a Substation", IEEE Power and Energy Society General Meeting, http://ieeexplore.ieee.org/document/6345766/, Jul. 22-26, 2012, 1 pg.

Raciti, "Anomaly Detection and its Adaptation: Studies on Cyber-Physical Systems", Department of Computer and Information Science, Linkoping University, Thesis No. 1586, Mar. 2013, 87 pp.

Pena et al., Anomaly Detection Using Forecasting Methods ARIMA and HWDS, 32nd International Conference of the Chilean Computer Science Society (SCCC), http://ieeexplore.ieee.org/document/7814437/, Nov. 11-15, 2013, 4 pp.

* cited by examiner

ANOMALY FORECASTING AND EARLY WARNING GENERATION

GOVERNMENT INTEREST

This invention was made with Government support under contract number DEOE0000833 awarded by the United States Department of Energy. The Government has certain rights in this invention.

BACKGROUND

Machine and equipment assets, generally, are engineered to perform particular tasks as part of a business process. For example, assets can include, among other things and without limitation, industrial manufacturing equipment on a production line, drilling equipment for use in mining operations, gas and steam power generating turbines, wind turbines that generate electricity on a wind farm, transportation vehicles, ship propulsion systems and the like. As another example, assets may include healthcare machines and equipment that aid in diagnosing patients such as imaging devices (e.g., X-ray or MRI systems), monitoring devices, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increase in sensor capabilities, decrease in sensor costs, and the proliferation of mobile technologies have generated new opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

To prevent infection, human beings have developed various environmental precautions (e.g., public health programs, clean water etc.) as well as external physical protection mechanisms (e.g., washing hands, protective clothing etc.). Despite these protections in place, various pathogens are able to attack the human body. In response, biological structures of a person's immune system may constantly defend against these pathogens to keep the body functioning. In a similar fashion, to protect industrial control systems, information technology mechanisms (e.g., anti-virus software, trusted boot, etc.) as well as operational technology mechanisms (e.g., Opshield, SecurityST, etc.) have each been developed.

However, information technology and operational technology protection mechanisms are inadequate. As a result, cyber threats continue to grow in number and sophistication. Attackers have shown the ability to find and exploit residual faults and use them to formulate cyber-attacks. Most software systems in use today run substantially similar software. As a result, a successful cyber-attack can bring down a large number of installations running similar software. Furthermore, as more software is made available (e.g., through the cloud), the situation can only get worse. Accordingly, what is needed is a better method for protecting control systems against cyber-attacks.

SUMMARY

Embodiments described herein improve upon the prior art by providing a feature-based anomaly forecasting process for early warning detection capable of identifying anomalies in data provided from a physical asset or virtual asset such as a machine or equipment or its digital replica. The system may receive an incoming signal sensed from or about a physical asset, forecast an upcoming signal that will present an anomaly, and output an early warning signal to a control system or operator. In some aspects, the method can be implemented as software that is deployed on a cloud platform such as an Industrial Internet of Things (IIoT). As described herein, an anomaly may refer to intelligent cyber-attacks and naturally accruing fault and failures. Accordingly, the embodiments protect against unauthorized intrusions as well as fault prevention.

In an aspect of an embodiment, provided is a method including storing feature behavior information associated with data received from at least one monitoring node of an asset, the feature behavior information including a normalcy boundary identifying normal feature behavior and abnormal feature behavior for the at least one monitoring node in feature space, receiving input signals from the at least one monitoring node of the asset and transforming the input signals into feature values in the feature space, forecasting that a future feature value of a feature that is currently within the normalcy boundary is going to move outside the normalcy boundary based on the feature values of the feature within the normalcy boundary, and outputting information concerning the forecasted future feature value moving outside the normalcy boundary for display.

In an aspect of another embodiment, provided is a computing system including a storage configured to store feature behavior information associated with data received from at least one monitoring node of an asset, the feature behavior information including a normalcy boundary identifying normal feature behavior and abnormal feature behavior for the at least one monitoring node in feature space, a processor configured to receive input signals from the at least one monitoring node of the asset, and transform the input signals into feature values in the feature space, wherein the processor is further configured to forecast that a future feature value of a feature that is currently within the normalcy boundary is going to move outside the normalcy boundary based on the feature values of the feature within the normalcy boundary, and an output configured to output information concerning the forecasted future feature value moving outside the normalcy boundary for display.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
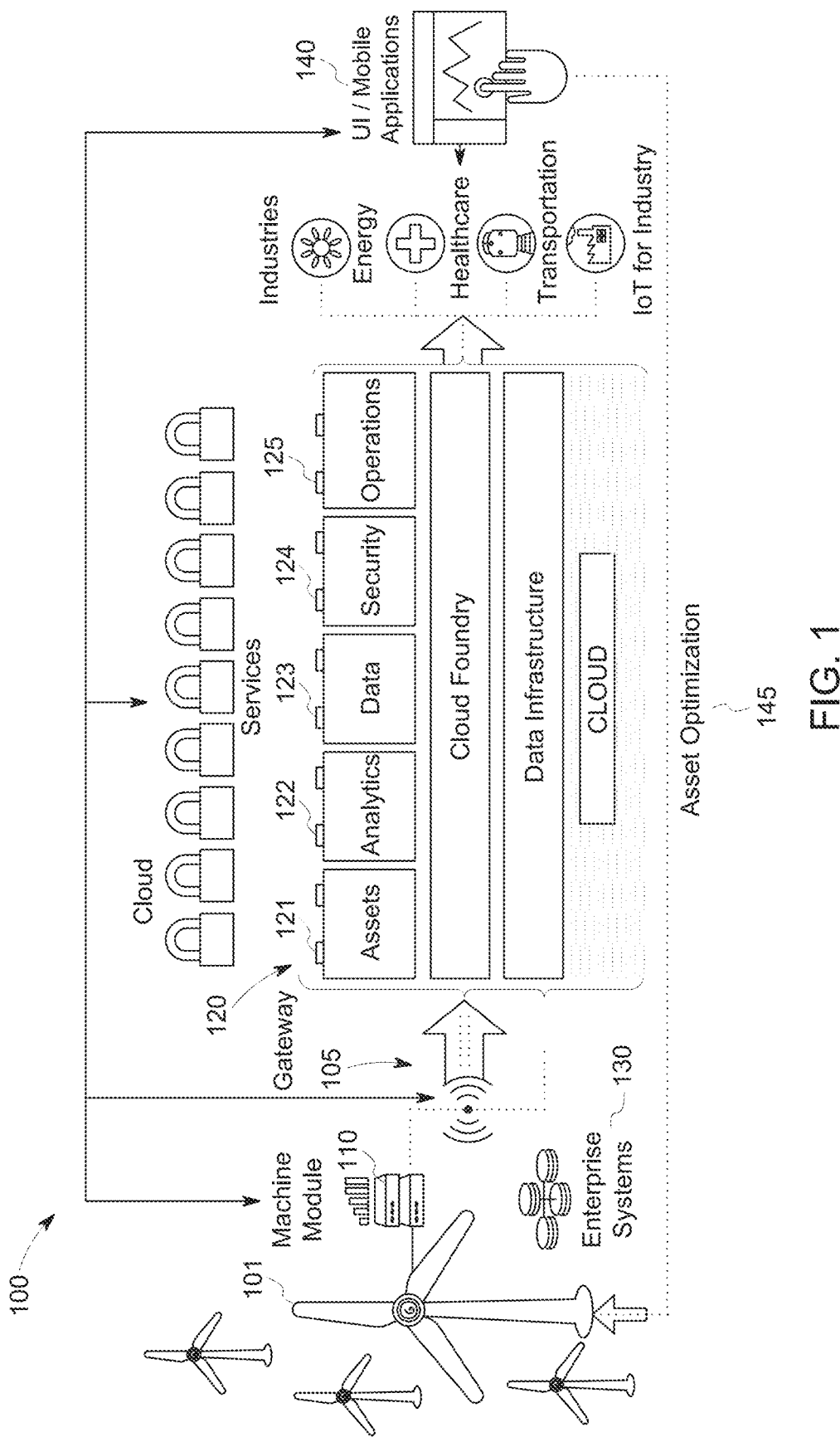
FIG. 1 is a diagram illustrating a cloud-computing environment associated with industrial systems in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown.

The example embodiments are directed to a system and method that can predict anomalies in a cyber-physical system. The system may forecast the outputs of cyber-physical system monitoring nodes such as sensors, using feature-driven dynamic models with different time-scales, for example, short-term (seconds ahead), mid-term (minutes ahead) and long term (hours to days ahead). The forecasted outputs may be transferred to global and localized attack detection methods to predict upcoming anomalies and generate early warnings at different time scales. The early warning may be provided to a system operator and may also be used for early engagement of various automated attack accommodation remedies and threat neutralizations.

The anomaly forecasting method described herein may be implemented within software such as an application, service, program, or the like. The software may be implemented within an asset or a device associated therewith, within a control system or a device associated with or coupled to the control system, within a cloud platform, within an intermediate device, and the like. There is no limitation on a location of the anomaly forecaster provided herein. The anomaly forecaster may receive signals that have been sensed from or about an asset such as a gas turbine, a wind turbine, a locomotive, an aircraft, a healthcare machine, an industrial manufacturing machine, drilling machinery/equipment, mining machinery/equipment, ship propulsion system and the like. The received data may include time series data such as measurements or other readings captured at various time intervals. Examples of time series data include speed, intensity, acceleration, temperature, pressure, weight, force, thrust, and the like.

When deployed and operating, assets may be attacked or otherwise compromised. As a result, the data received from an asset (e.g., input signals) may be faulty or otherwise inaccurate. There are many different types of attacks that an asset system may be subjected to such as espionage attacks, denial of service attacks, deception attacks (e.g., covert/ stealthy attack, zero dynamics attack, false data injection attack, replay attack, and the like, which are just a short sampling of potential threats that exist. Present information technology and operational technology approaches do not adequately protect assets from such attacks. The example embodiments provide a tool that can predict an upcoming attack or a future anomaly by analyzing features from signals received from the asset, and enable a control system, user, or other means to proactively prevent or mask the threat.

The example embodiments are directed to a system and method for identifying and neutralizing threats that occur in systems, for example, control systems for industrial manufacturing. The method described herein may achieve resiliency to cyber-attacks to provide uninterrupted, equipment-safe, controlled operation while attacks are in progress. As described herein, resiliency is the ability of a control system to force signals (or states) required for operational normalcy. As in a human body, once the method described herein detects a threat (e.g., an infection), the method destroys the threat. Analogous to biomimicry stated above, the example embodiments are directed to a method that extends domain-level security by creating an "immune system" from cyber-attacks specifically desirable to industrial systems.

The anomaly forecasting system and method may be incorporated within an industrial system that includes local and/or remote computing resources such as a cloud computing environment. While progress with machine and equipment automation has been made over the last several decades, and assets have become 'smarter,' the intelligence of any individual asset pales in comparison to intelligence that can be gained when multiple smart devices are connected together, for example, in the cloud. As described herein, an asset is used to refer to equipment and/or a machine used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions thereof. Data from the sensors can be added to the cloud platform. By bringing such data into a cloud-based environment, new software applications and control systems informed by industrial process, tools and expertise can be constructed, and new physics-based analytics specific to an industrial environment can be created. Insights gained through analysis of such data can lead to enhanced asset designs, enhanced software algorithms for operating the same or similar assets, better operating efficiency, and the like. However, when data is transferred from an edge of the cloud to the cloud platform, attacks may occur. The attacks may affect the processing of signals received from the edge of the cloud. The example embodiments provide a forecasting tool that is capable of identifying signals transmitted from the edge that are potentially under attack.

Assets described herein can include or can be a portion of an Industrial Internet of Things (IIoT). In an example, an IIoT connects assets including machines and equipment, such as turbines, jet engines, healthcare machines, locomotives, oil rigs, and the like, to the Internet and/or a cloud, or to each other in some meaningful way such as through one or more networks. The examples described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Assets may have strict requirements for cost, weight, security, performance, signal interference, and the like, in which case enabling such an interface is rarely as simple as combining the asset with a general-purpose computing device. To address these problems and other problems resulting from the intersection of certain industrial fields and the IIoT, embodiments provide a cloud platform that can receive and deploy applications from many different fields of industrial technologies.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community that is communicatively coupled with the cloud computing system 120. In an example, a machine module 110 receives information from, or senses information about, at least one asset member of the asset community, and configures the received information for exchange with the cloud computing system 120. The machine module 110 may be coupled to the cloud computing system 120 or to an enterprise computing system 130 via a communication gateway 105.

The communication gateway 105 may include or may use a wired or wireless communication channel that extends at least from the machine module 110 to the cloud computing system 120. The cloud computing system 120 may include several layers, for example, a data infrastructure layer, a cloud foundry layer, and modules for providing various functions. In FIG. 1, the cloud computing system 120 includes an asset module 121, an analytics module 122, a data acquisition module 123, a data security module 124, and an operations module 125, but the embodiments are not limited thereto. Each of the modules includes or uses a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload applications to the cloud computing system 120. As another example, the interface device 140 may be used to access analytical applications deployed on the cloud computing system 120. In an example, information about the asset community may be presented to an operator at the interface device 140. The information about the asset community may include information from the machine module 110, information from the cloud computing system 120, and the like. The interface device 140 can include options for optimizing one or more members of the asset community based on analytics performed at the cloud computing system 120.

The example of FIG. 1 includes the asset community with multiple wind turbine assets, including the wind turbine 101. However, it should be understood that wind turbines are merely used in this example as a non-limiting example of a type of asset that can be a part of, or in data communication with, the first AMP 100. Examples of other assets include gas turbines, steam turbines, heat recovery steam generators, balance of plant, healthcare machines and equipment, aircraft, locomotives, oil rigs, manufacturing machines and equipment, textile processing machines, chemical processing machines, mining equipment, ship propulsion system, and the like. Furthermore, the cloud computing system 120 optionally includes a local, system, enterprise, or global computing infrastructure that can be optimized for industrial data workloads, secure data communication, and compliance with regulatory requirements.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

The anomaly forecasting and early warning detection method may be implemented within one of the modules of the cloud computing system 120, within the asset, within an intermediate device between the asset and a control system, and the like. As another example, the anomaly forecasting and early warning detection method may also or instead be implemented elsewhere such as within an asset, within the cloud computing system 120, within another device within the system, and the like. Raw data may be provided to the cloud computing system 120 via the assets included in the asset community and accessed by applications deployed on the cloud computing system 120. During operation, an asset may transmit sensor data to the cloud computing system 120 and prior to the cloud computing system 120 storing the sensor data, the sensor data may be filtered using the anomaly forecasting and early warning detection method described herein.

The anomaly forecaster described herein may receive signals that have been sensed from or about an asset such as a gas turbine, a wind turbine, a locomotive, an aircraft, a healthcare machine, an industrial manufacturing machine, drilling machinery/equipment, mining machinery/equipment, and the like. The anomaly forecaster may receive at least one input signal that includes time series data or an input signal that has been converted from the time domain into the frequency domain (i.e., frequency space). The time series data may include measurements or other readings captured at various time intervals. Examples of time series data include speed, intensity, acceleration, weight, force, thrust, and the like. The time series data may be transformed into the feature domain by the anomaly forecaster if it is not already in the frequency domain.

As an example, the anomaly forecaster may be included in a general system such as a cyber-physical system, a software system, a bio-mechanical system, a network system, a communication system, and/or the like, which contains access to a continuous stream of data in the form of time series signals or other types of data signals. The signals may be generated from data sensed by monitoring nodes such as sensor nodes (e.g., physical and/or virtual sensors), actuator nodes (e.g., hard and/or soft actuators generated from open or closed loop system), controller nodes (e.g., controller node signals), reference nodes (e.g., reference signals), and the like. In some examples, logical signals may also be considered. A total number of signals that may be used for providing immunity to a system may be equal to a total number of nodes that exist in sensors, actuators, controllers and reference nodes, or it may be more or less number of nodes. Some or all combinations of these nodes can be used for monitoring, anomaly forecasting, threat warning, and neutralization.

Figure 2:
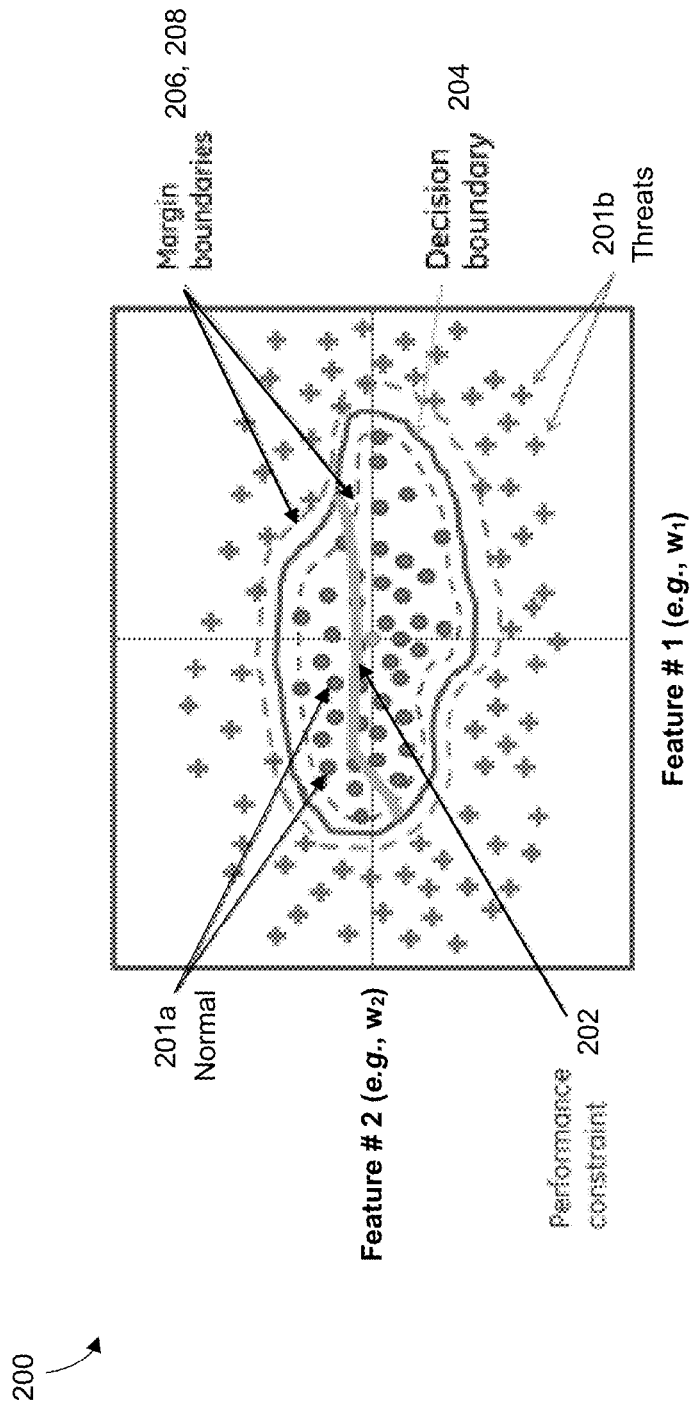
FIG. 2 is a diagram illustrating a boundary for use in anomaly forecasting in a feature space in accordance with an example embodiment.

FIG. 2 illustrates a graph 200 of a feature boundary for use in anomaly forecasting in a feature space in accordance with an example embodiment. As described herein, a feature as applied to data might include a maximum, a minimum, a mean, a standard deviation, a variance, a range, a current value, a settling time, Fast Fourier Transform ("FFT") spectral components, linear and non-linear principal components, independent components, sparse coding features, deep learning features, and the like. In the example of FIG. 2, the normal performance of the system (e.g., asset, node, etc.) is shown graphically as a performance constraint 202 represented by a thick curved line. The performance constraint 202 is within an inner region of a decision boundary 204 (also referred to as a normal operating region). The inner region represents historically normal feature values 201 (e.g., feature vectors) for a node. Meanwhile, an outer region of the decision boundary 204 (also referred to as abnormal operation region) represents abnormal feature values which are potentially threats/anomalies within the system. In some cases, the decision boundary 204 may be a hard boundary or it may be a soft boundary and include inner and outer margins 206 and 208. However, embodiments are not limited thereto.

For a given scenario, time series signals (e.g., ~45 seconds) may be captured and pre-processed. These signals may be processed by feature extraction algorithms (e.g., principal component analysis) to reduce the dimensionality or order of the system. For example, time series data from monitoring sensor nodes may be converted into feature vectors in feature space. The procedure may be the same for all other signals. When principal components are used as features, weights become the features in reduced dimensions within the feature space. In the pre-processing step, temporal normalization of node data may be performed. As an example, when principal components are used as features, the normalized output may be expressed as a weighted linear combination of base functions.

Under normal operation, features may be extracted from overlapping batches of time series data. The process may be continued over each overlapping batch resulting in a new time series of feature evolution in the feature space. Then, the feature time series may be used for performing system identification (i.e., dynamic modeling) to model the time evolution of features. A selected subset of the features may be used for dynamic modeling using state space system identification methods. The dynamic models may be in state space format. The dynamic modeler may use a multivariate vector autoregressive model (VAR), or regression models for fitting dynamic models into feature time series data at different time scales. If this approach is not adequate, another model may be used such as a tuned feature-based digital twin model, a TVP_VAR (time-varying parameter vector autoregressive) model computed from feature evolution data or a priori distribution to obtain various matrices representing state space form (i.e., system matrix, control matrix, output matrix and feedforward matrix). A boundary and performance resilient estimator (BPRE) may compute a threat/attack boundary (e.g., decision boundary 204) and, also compute a performance constrained resilient estimator from the normal data values received historically from the asset. The decision boundary may be computed using classification based machine learning methods such as SVM (support vector machines) or ANN (artificial neural networks).

In FIG. 2, the feature values 201*a* positioned inside the decision boundary 204 are considered normal feature values 201*a* and are not considered to present threats while the feature values 201*b* positioned outside the decision boundary 204 are considered abnormal feature values 201*b* (or attack signals). The abnormal feature values 201*b* outside the decision boundary 204 may be due to cyber-attacks or natural faults/failures. In some cases, a cyber-attack or other threat may cause a previously normal feature vectors that is positioned within the normal operating region of the decision boundary 204 to a position that is outside of the decision boundary 204 or the abnormal operating region designated by attack points 201*b*.

According to various embodiments, when a normal feature value 201*a* within the normal region begins to move towards the decision boundary 204 it may indicate that the asset or the node is about to be or is currently undergoing an attack. The anomaly forecaster provided herein may identify normal feature values 201*a* within the normal operating region that are moving towards the decision boundary 204 and predict if and when an upcoming or future signal of the presently normal feature value will cross over the decision boundary 204 and become an abnormal feature value 201*b*. Rather than wait until the feature value has crossed into the threat region and become an abnormal feature value 201*b*, the anomaly forecaster may predict that the feature value is going to cross into the abnormal operating region and output an early warning signal, for example, to a control system, an operator, a threat neutralizer, and the like, which can compensate for the attack by making adjustments in the system, employing a threat neutralizer, powering down, and the like.

Figure 3:
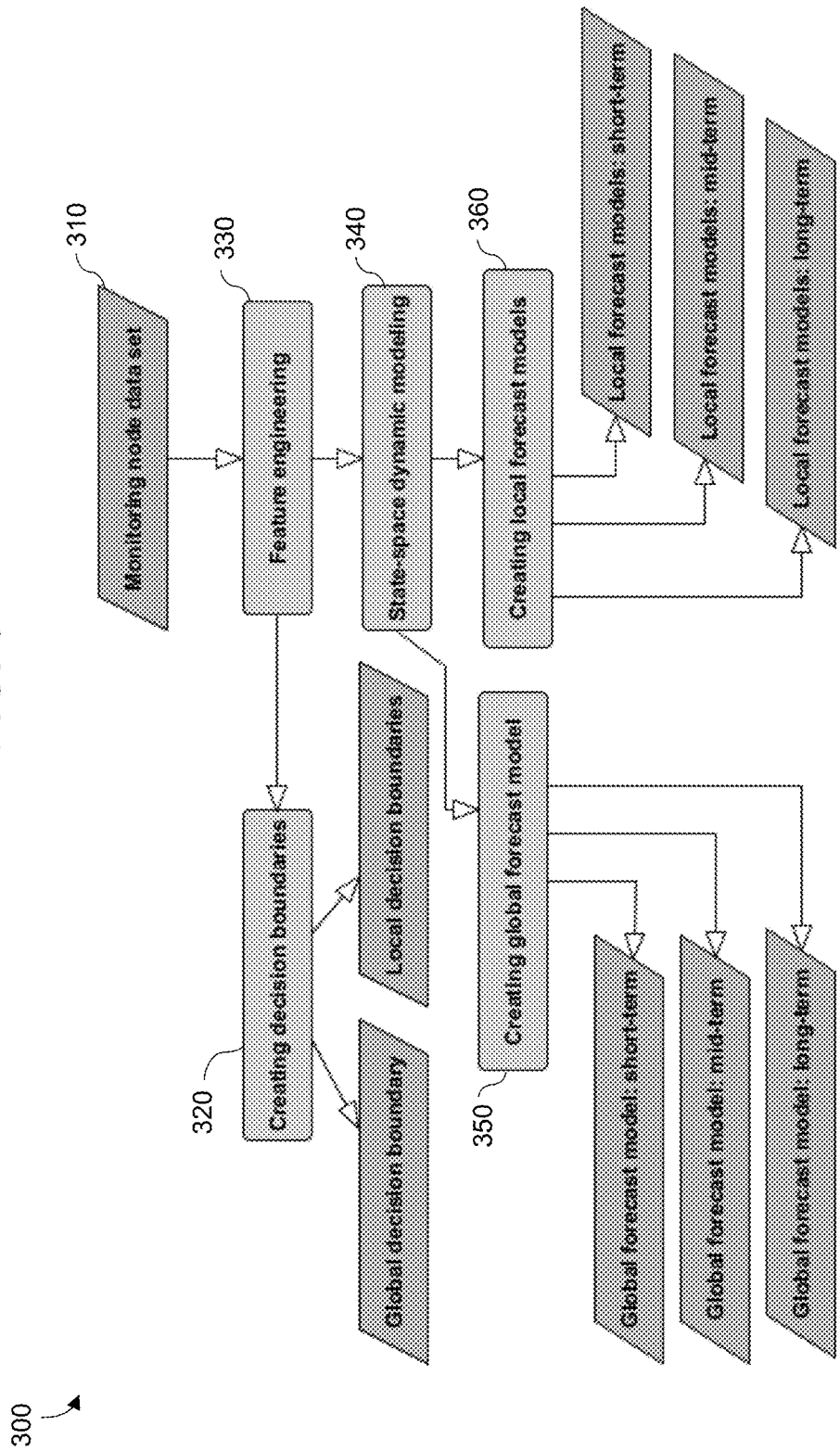
FIG. 3 is a diagram illustrating a training process for anomaly forecasting in accordance with an example embodiment.
Figure 4:
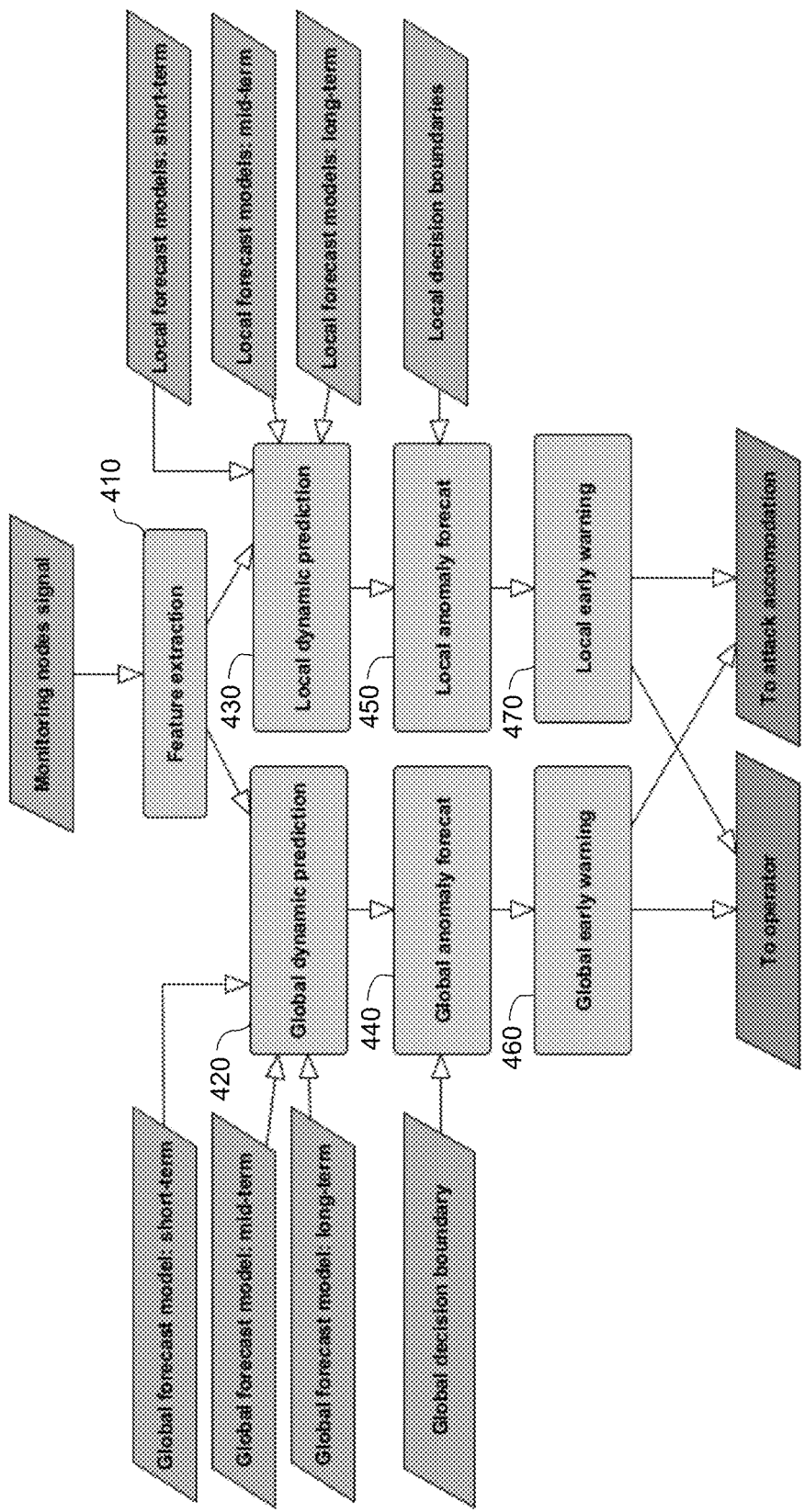
FIG. 4 is a diagram illustrating an anomaly forecasting process in accordance with an example embodiment.

FIG. 3 illustrates a training process 300 for anomaly forecasting in accordance with an example embodiment, and FIG. 4 illustrates an anomaly forecasting process 400 in accordance with an example embodiment. In some cases, the training process 300 may be performed while the forecasting system is offline while the forecasting process 400 may be performed while the system is online. The training process 300 may generate an anomaly forecaster for cyber-physical systems that may be used for cyber-attack or fault detection, localization and early warning. The training process 300 may be used to develop feature-driven dynamic models in three different time-scales, including short-term (seconds ahead), mid-term (minutes ahead) and long term (hours to days ahead). However, the embodiments are not limited to these time scales, based on historical data associated with an asset or system.

In 310, monitoring node data sets are provided and may include feature data for use in feature engineering. The monitoring node data sets are used for feature engineering and decision boundary generation. For example, in 320, decision boundaries are generated for each monitoring node. For example, the decision boundaries may include one or more local decision boundaries (or individual node boundaries) and one global decision boundary (or a combined decision boundary based on a combination of monitoring nodes). In 330, state space dynamic models are generated for the time-evolution of features both for global features and local features (i.e. per monitoring node). Parameters and orders of each state space dynamic model may be estimated as VAR models which are further described below.

In 340 and 350 forecast models (e.g., local and global) are generated. For each of the global and local forecast models, in this example, three models are used including a short-term forecasting model, a mid-term forecasting model, and a long-term forecasting model. For example, the short-term forecast model may be a dynamic state space with a VAR model with a sampling time of 1 second, the mid-term forecast model may be a dynamic state space with a VAR model with a sampling time of 1 minute or more but less than 1 hour, and the long-term forecast model may be a dynamic state space with a VAR model with a sampling time of 1 hour or more but less than a day. Similar models are generated for local features, per monitoring node. For example, if there are 6 monitoring nodes, the off-line module may generate a total of 21 state space models consisting of 3 global forecast models and 18 local forecast models.

According to some embodiments, a multivariate Vector Auto-Regressive ("VAR") model approach may be used to fit dynamic models into feature time series data. A VAR model may, for example, have the following form:

$$y(k+1)=A_1 y(k)+A_2 y(k-1)+ \ldots +A_p(k-p+1)+b+e(k)$$

where y(k) is the value of the multivariate feature time series at sample time t, p is the number of lags (i.e., delays) in the model, b is a constant affine term, and e(k) is white Gaussian random noise. The size of they vector, m, may equal the number of features selected. A VAR(p) model may be identified for each monitoring node, resulting in matrices $A_1$ to $A_p$, the b vector, and covariance matrix Q of e, for each node.

As the number of lags in the VAR model increase, the model fits better into the training data set but there are more parameters n of the model to be estimated. The order of the VAR model, p, may selected automatically using Bayesian Information Criterion ("BIC") or Akaike Information Criterion ("AIC"). Note that BIC may provide a good balance between the model fitness and complexity (e.g., in order to avoid over-fitting). The system may use a weighted average of features to compute the BIC per different lag numbers. In computing the weighted average BIC, the BIC value of each feature might be weighted by the magnitude of the feature so that the features with higher magnitudes are weighted more, and as such fitting a better model to those features becomes more important. The number of lags in the model, p, is then selected based on the value of p, that minimize the weighted averaged BIC. The identified VAR(p) model may then be converted into standard state space structure. This process may be done separately for each monitoring node, which may be the result of different values of p for each monitoring node. Note that the conversion to standard state space may be written in compact form as:

$$x(k+1)=Ax(k)+Bu(k)+Ee(k)$$

$$y(k)=Cx(k)$$

where, u(k) is a fictitious unit step input to accommodate for the affine term. During the training phase, one such state space feature-driven dynamic model may be built for each monitoring node. Although a VAR modeling approach is described herein, note that other modeling approaches might be used instead in any of the embodiments (e.g., a Markov model approach).

The on-line module is shown in process 400 of FIG. 4. In 410, each monitoring node signal goes through real-time feature extraction to create real-time feature time series. The features may be computed using a sliding window over the monitoring node signals. In 420 and 430, the extracted feature time series are input to multi-step predictors for both global features and local features. In this example, there is one multi-step predictor per forecasting model. For example, the multi-step predictors may be based on a Kalman filter, a receding horizon predictor, or any multi-step prediction method. The multi-step predictors can use constant or adaptive (time-varying) process and measurement noise covariance matrices. For constant covariance matrices, Q matrix may be used to process noise covariance and may be recursively fed into the measurement noise covariance for future predictions. The adaptive values of the covariance matrices may be initialized using the prescribed constant values and changed in real-time based on X-square tests on the normalized innovation (output estimation error). The predictors may also utilize a forgetting factor to weight current estimates vs. previous values.

Using the models generated in the training phase and the multi-step predictors, in 440 and 450 future values of the feature time series are forecasted, both for local and global features, in three time scales including short-term feature forecast: feature values of the global and local features up to several seconds, mid-term forecast model: feature values of the global and local features up to several minutes, and long-term forecast model: feature values of the global and local features up to several days.

The prediction horizon of the multi-step forecasts can be determined using simulations, based on the prediction error and a confidence interval. For example, the prediction horizon may be up to the point that the actual prediction error is larger than three standard divisions of the corresponding eigenvalue of the Kalman filter estimation error covariance matrix (e.g., 99% confidence). Alternatively, the prediction horizon may be bound to the quality of the forecasting models. For example, the prediction horizon may be set up to the point that the norm of the Kalman filter estimation error covariance matrix, P, becomes three times larger than the norm of the process noise covariance matrix, $E^TQE$, in the forecast model.

$$\|P\| > 3 * \|E^TQE\|$$

The forecasted outputs of models (aka, future values of the features) are compared to the corresponding decision boundaries for anomaly detection. While comparing the feature vectors to the decision boundary, estimated time to cross the decision boundary will provide information for future anomaly. If a future anomaly is detected, an early warning is generated in 460 and/or 470 in the operator display with anticipated time to reach anomalous state and a message may be sent to the automatic accommodation system for potential early engagement, threat neutralization, and the like.

Figure 5:
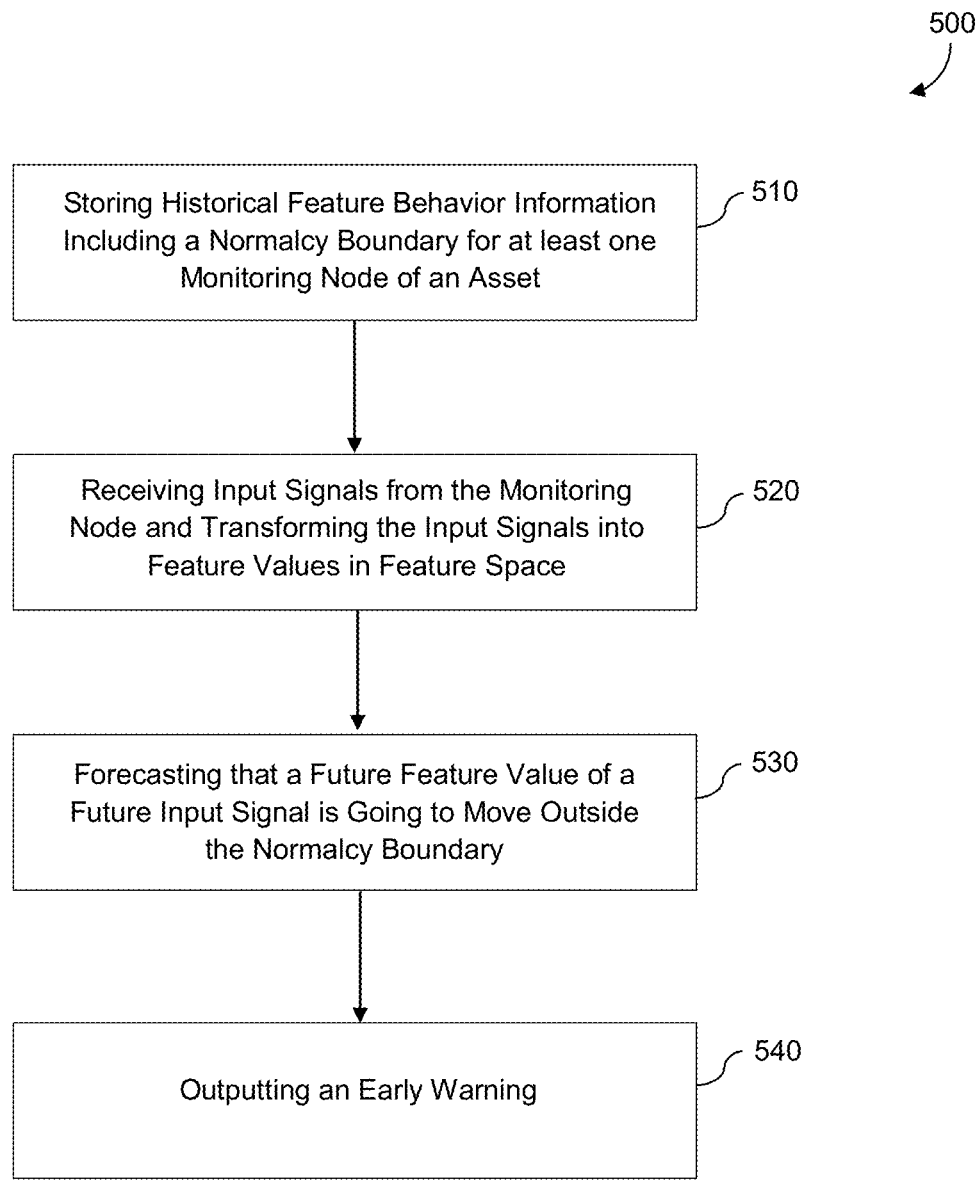
FIG. 5 is a diagram illustrating a method for forecasting anomalies in accordance with an example embodiment.

FIG. 5 illustrates a method 500 for forecasting anomalies in accordance with an example embodiment. For example, the method 500 may be performed by a computing device such as a user device, a cloud computing system, a server, and the like, receiving data from a monitoring node that may include one or more sensors attached to an asset within an Industrial Internet of Things (IIoT). Referring to FIG. 5, in 510, the method includes storing feature behavior information associated with data received from at least one monitoring node of an asset. For example, the feature behavior information may include a normalcy boundary, such as shown in the example of FIG. 2, identifying normal feature behavior and abnormal feature behavior for the at least one monitoring node in feature space. Here, the normalcy boundary in the feature space may include an interior region representing normal feature values and an exterior region representing abnormal feature values.

In 520, the method includes receiving input signals from the at least one monitoring node of the asset and transforming the input signals into feature values in the feature space. Here, the feature values may include feature values included within the normalcy boundary and/or feature values outside the normalcy boundary. For purposes of easier understanding of the description, it is assumed that at least one feature value is located within the normalcy boundary. In 530, the method includes forecasting that a future feature value of a feature that is presently located within the normalcy boundary is going to move outside the normalcy boundary based on the feature values of the feature within the normalcy boundary. In 540, the method includes outputting information concerning the forecasted future feature value being outside the normalcy boundary for display. For example, an early warning about the future feature value moving outside the normalcy boundary may be output to at least one of a control system of the asset and an operator of the asset.

In some embodiments, the forecasting in 530 may include executing or processing at least one forecasting model based on the feature values of a feature within the normalcy boundary to determine that the future feature value of the feature will move outside the normalcy boundary. For example, the forecasting model may include at least one of a short-term forecasting model configured to predict locations of future feature values in feature space up to a minute in advance, a mid-term forecasting model configured to predict locations of future feature values in feature space up to an hour in advance, and a long-term forecasting model configured to predict locations of future feature values in feature space up to a day in advance. In addition to predicting that a feature will move outside the normalcy boundary, the forecasting in 530 may also predict when the future feature value is going to move outside the normalcy boundary.

In some embodiments, the stored feature behavior information may be associated with signals received from one monitoring node (e.g., local) or a plurality of monitoring nodes (e.g., global) of the asset and may include a local normalcy boundary and/or a global normalcy boundary identifying normal local and/or global feature behavior for the monitoring nodes of the asset. For example, the receiving in 520 may include receiving input signals from a plurality of monitoring nodes, and the forecasting in 530 may include forecasting that a global future feature value corresponding to a combined future input signal from the plurality of monitoring nodes is going to move outside the global normalcy boundary.

Figure 6:
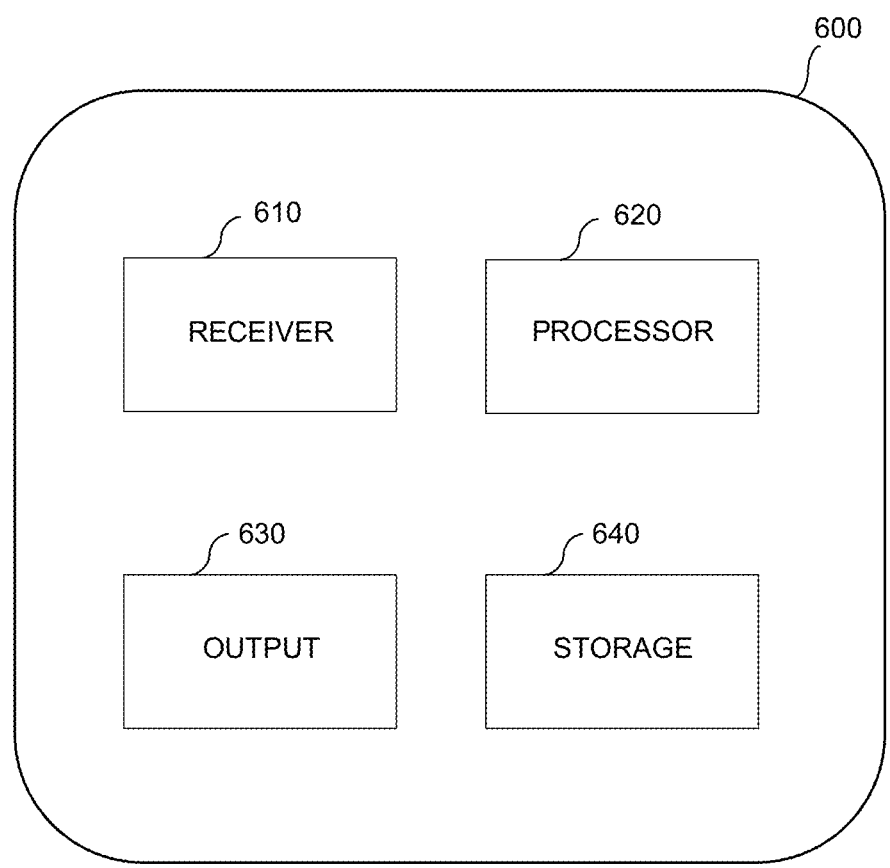
FIG. 6 is a diagram illustrating a computing device for forecasting anomalies in accordance with an example embodiment.

FIG. 6 illustrates a computing device 600 for forecasting anomalies in accordance with an example embodiment. In some cases, the computing device 600 may be implemented within a control system, an asset, a cloud environment, and/or the like. Also, the computing device 600 may perform the method 500 of FIG. 5. Referring to FIG. 6, the computing device 600 includes a receiver 610, a processor 620, an output 630, and a storage device 640. Although not shown in FIG. 6, the device 600 may include other components such as a display, an input unit, and the like. The receiver 610 and the output 630 may include a signal receiver/transmitter, a transceiver, a network interface, and the like, and may transmit and receive data over a network such as the Internet, a private network, a public network, and the like, and may transmit and receive data via a wired connection. The receiver 610 and the output 630 may be a wireless communicator, a wired communicator, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The storage device 640 is not limited to any particular storage device and may include any known memory device such as RAM, ROM, hard disk, and the like.

According to various embodiments, the storage 640 may store feature behavior information associated with data received from at least one monitoring node of an asset. For example, the feature behavior information may include a normalcy boundary identifying historically normal feature behavior and historically abnormal feature behavior for the at least one monitoring node in feature space. The processor 620 may receive input signals from the at least one monitoring node of the asset, and transform the input signals into feature values in the feature space. Here, the input signals may be received by the receiver 610 (which may be a network interface) and transmitted to the processor 620. The processor 620 may forecast that a future feature value of a feature that is currently within the normalcy boundary is going to move outside the normalcy boundary based on the feature values of the feature within the normalcy boundary. In addition, the output 630 may output information concerning the forecasted future feature value moving outside the normalcy boundary for display. For example, the output 630 may output an early warning about the future feature value to at least one of a control system of the asset and an operator of the asset.

According to various embodiments, the processor 620 may perform the forecasting by processing at least one forecasting model based on the features values of the feature within the normalcy boundary to determine that the future feature value of the feature is going to move outside the normalcy boundary. For example, the at least one forecasting model may include one or more of a short-term forecasting model configured to predict locations of future feature values in features space up to a minute in advance, a mid-term forecasting model configured to predict locations of future feature values in feature space up to an hour in advance, and a long-term forecasting model configured to predict locations of future feature values in feature space up to a day in advance.

Once the security of a system is compromised, the adversarial impact will eventually propagate through the system until it gets detected by the attack detection mechanisms. However, by the time known related mechanisms have detected an attack, the damages may have been already done, and the impact may be too large to be accommodated. The example embodiments provide an early warning capability to the attack detection so that a security breach is detected and alarmed at an early stage both for operator response and for attack accommodation.

The anomaly forecaster described herein enables early detection of salient and stealthy attack which could otherwise, remain in the asset for days or even months without being caught. It also enables early engagement of the system operator or the automatic accommodation in a cyber incident. Furthermore, the anomaly forecast system can predict future system failures and malfunctions and may be used as a tool for predictive health monitoring and prognostics.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
    storing feature behavior data received from a sensor of an industrial asset, the feature behavior data comprising a normalcy boundary identifying normal feature behavior and abnormal feature behavior for the sensor of the industrial asset in feature space;
    receiving input signals from the sensor and transforming the input signals into feature values in the feature space;
    predicting, via a plurality of machine learning models comprising a plurality of different time scales, respectively, future values of a feature that is currently within the normalcy boundary that is going to move outside the normalcy boundary based on the current values of the feature within the normalcy boundary;
    determining that the sensor of the industrial asset is subject to an attack based on the predicted future values of the feature in the feature space that is currently within the normalcy boundary and that is predicted to move outside the normalcy boundary in advance; and
    outputting an early warning concerning the sensor of the industrial asset that is determined to be subject to the attack for display via a user interface.

2. The method of claim 1, wherein the sensor is included in a monitoring node that comprises actuators or controller nodes attached to the asset within an Industrial Internet of Things (IIoT).

3. The method of claim 1, wherein the normalcy boundary in the feature space comprises a round shape identifying normal features values and abnormal feature values associated with the asset.

4. The method of claim 1, wherein the predicting comprises processing at least one forecasting model based on the features values of the feature within the normalcy boundary to determine that a future feature value of the feature is going to move outside the normalcy boundary.

5. The method of claim 4, wherein the plurality of machine learning models comprise at least one of a short-term forecasting model configured to predict locations of future feature values in features space up to a minute in advance, a mid-term forecasting model configured to predict locations of future feature values in feature space up to an hour in advance, and a long-term forecasting model configured to predict locations of future feature values in feature space up to a day in advance.

6. The method of claim 1, wherein the predicting further comprises forecasting when a future feature value is going to move outside the normalcy boundary, wherein the determining further comprises determining that the sensor of the industrial asset is subject to an attack based on when the future feature value is going to move outside the normalcy boundary.

7. The method of claim 1, wherein the outputting comprises outputting the early warning about the future feature value to at least one of a control system of the asset and an operator of the asset.

8. The method of claim 1, wherein the stored feature behavior information is associated with signals received from a plurality of sensors of the asset and comprises a global normalcy boundary identifying normal global feature behavior for the plurality of sensors in combination.

9. The method of claim 8, wherein the receiving comprises receiving input signals from the plurality of sensors, and the predicting comprises forecasting that a global future feature value corresponding to a combined future input signal from the plurality of sensors is going to move outside the global normalcy boundary.

10. The method of claim 1, wherein the outputting comprises outputting the early warning signal indicating that a future feature value is going to become an abnormal feature prior to a value of the feature crossing over the normalcy boundary.

11. A computing system comprising:
a storage configured to store feature behavior data received from a sensor of an industrial asset, the feature behavior data comprising a normalcy boundary identifying normal feature behavior and abnormal feature behavior for the sensor of the industrial asset in feature space;
a processor configured to
receive input signals from the sensor,
transform the input signals into feature values in the feature space,
predict, via a plurality of machine learning models comprising a plurality of different time scales, respectively, future values of a feature that is currently within the normalcy boundary that is going to move outside the normalcy boundary based on the feature values of the feature within the normalcy boundary,
determine that the sensor of the industrial asset is subject to an attack based on the predicted future values of the feature in the features space that is currently within the normalcy boundary and that is predicted to move outside the normalcy boundary in advance, and
output an early warning concerning the sensor of the industrial asset that is determined to be subject to the attack for display via a user interface.

12. The computing system of claim 11, wherein the sensor is included within a monitoring node that comprises one or more actuators or controllers attached to the asset within an Industrial Internet of Things (IIoT).

13. The computing system of claim 11, wherein the normalcy boundary in the feature space comprises a round shape identifying normal features values and abnormal feature values associated with the asset.

14. The computing system of claim 11, wherein the processor is configured to process at least one forecasting model based on the feature values of the feature within the normalcy boundary to determine that a future feature value of the feature is going to move outside the normalcy boundary.

15. The computing system of claim 14, wherein the plurality of machine learning models comprise at least one of a short-term forecasting model configured to predict locations of future feature values in features space up to a minute in advance, a mid-term forecasting model configured to predict locations of future feature values in feature space up to an hour in advance, and a long-term forecasting model configured to predict locations of future feature values in feature space up to a day in advance.

16. The computing system of claim 11, wherein the processor is further configured to predict when a future feature value is going to move outside the normalcy boundary and determine that the sensor of the industrial asset is subject to an attack based on when the future feature value is going to move outside the normalcy boundary.

17. The computing system of claim 11, wherein the output is further configured to output the early warning about the future feature value to at least one of a control system of the asset and an operator of the asset.

18. The computing system of claim 11, wherein the stored feature behavior information is associated with signals received from a plurality of sensors of the asset and comprises a global normalcy boundary identifying normal global feature behavior for the plurality of sensors in combination.

19. The computing system of claim 18, wherein the processor is configured to receive input signals from the plurality of sensors, and forecast that a global future feature value corresponding to a combined future input signal from the plurality of sensors is going to move outside the global normalcy boundary.

20. A non-transitory computer readable storage medium having stored therein instructions that when executed cause a processor to perform a method comprising:
storing feature behavior data received from a sensor of an industrial asset, the feature behavior data comprising a normalcy boundary identifying normal feature behavior and abnormal feature behavior for the sensor of the industrial asset in feature space;
receiving input signals from the sensor and transforming the input signals into feature values in the feature space;
predicting, via a plurality of machine learning models comprising a plurality of different time scales, respectively, future values of a feature that is currently within the normalcy boundary that is going to move outside the normalcy boundary based on the current values of the feature within the normalcy boundary;
determining that the sensor of the industrial asset is subject to an attack based on the predicted future values of the feature in the features space that is currently within the normalcy boundary and that is predicted to move outside the normalcy boundary in advance; and
outputting an early warning concerning the sensor of the industrial asset that is determined to be subject to the attack for display via a user interface.

21. The non-transitory computer readable storage medium of claim 20, wherein the predicting comprises processing at least one forecasting model based on the features values within the normalcy boundary to determine that a future feature value will be located outside the normalcy boundary.

\* \* \* \* \*